Patented Dec. 24, 1946

2,412,960

UNITED STATES PATENT OFFICE 2,412,960

FLUID COMPOSITIONS CONTAINING COPOLYMERS OF TETRAFLUOROETHYLENE AND ETHYLENE

Kenneth L. Berry, Hockessin, Del., assignor to E. I. du Pont de Nemours & Company, Wilmington, Del., a corporation of Delaware No Drawing. Application March 19, 1945, Serial No. 583,640

2 Claims. (Cl. 260—32)

This invention relates to compositions of matter and more particularly to new and useful fluid compositions comprising tetrafluoroethylene copolymers.

Copolymers of tetrafluoroethylene and ethylene, particularly those containing a high proportion of tetrafluoroethylene, are characterized by high melting points, non-workability and insolubility in the common organic solvents. Such generally useful solvents as dimethyl succinate or dimethyl phthalate will not dissolve copolymers of tetrafluoroethylene and ethylene containing a high proportion of the former constituent. These copolymers are also soluble only slightly or to a limited degree in the high boiling ketones such as isofenchone, acetophenone, benzophenone, and isophorone. Somewhat better solubility is obtained in a complex mixture of unsaturated cyclic ketones boiling within the range of 250° C. to 325° C., and containing from twelve to eighteen carbon atoms. Although the high melting point and general insolubility of the copolymers of tetrafluoroethylene with ethylene is desirable for many applications, these same properties make the polymers unavailable for other uses. For many applications there are advantages in the use of solutions rather than molten compositions to achieve the fluid state necessary in lacquers, coating compositions, and dopes suitable for use in forming various objects, such as films, sheets, ribbons, bristles and filaments. A still further advantage in the use of solutions lies in the ease with which they can be cast into films or coatings of uniform thickness, which is mechanically more difficult to accomplish with a molten composition due to its relatively high viscosity.

This invention has as an object new and useful compositions of matter. A further object is a method for preparing new and improved tetrafluoroethylene copolymer compositions useful in making filaments, bristles, ribbons, films, sheets and coatings on various materials such as metal. Other objects will appear hereinafter.

The above objects are accomplished by dissolving a tetrafluoroethylene/ethylene copolymer containing from 50 to 85% of tetrafluoroethylene in a neutral ester of a saturated dicarboxylic acid containing at least 5 carbon atoms, such ester being free of multiple carbon to carbon linkages and containing from 7 to 18 carbon atoms.

The following example is further illustrative of the practice of the invention:

A mixture of 1 part of tetrafluoroethylene/ethylene copolymer having a mole ratio of tetrafluoroethylene/ethylene of 1:0.78 (82% tetrafluoroethylene) and 9 parts of diisobutyl adipate was heated while stirring at 260 to 265° C. whereupon a clear solution resulted. Upon cooling the solution gelation occurred.

The tetrafluoroethylene/ethylene copolymers can be obtained by polymerizing a mixture of tetrafluoroethylene and ethylene, containing at least 50% of tetrafluoroethylene under pressures substantially above atmospheric pressure at a temperature in the range of 40 to 150° C. in the presence of water or a mixture of water and a non-reactive diluent and oxygen or a peroxy catalyst. The polymer used in the foregoing example was prepared by the following procedure: A stainless steel high pressure reactor was flushed with oxygen-free nitrogen and charged with 150 parts of deoxygenated water, 50 parts of tertiary butyl alcohol and 0.3 part of benzoyl peroxide. The reactor was then closed and further charged with 100 parts of a mixture of tetrafluoroethylene and ethylene (mole ratio 1:1.28). The polymerization was then carried out by heating the reactor at 80° C. while maintaining an internal pressure of 1600–1800 lbs./sq. in. by the periodic injection of additional quantities of the above indicated tetrafluoroethylene-ethylene monomer mixture. The sum of individual pressure drops during the reaction period of 19 hours was 1005 lbs. The reactor was cooled, the pressure released and the copolymer discharged.

Solutions similar to that described in the above example were obtained by heating the copolymer with the following esters: dimethyl glutarate, dimethyl adipate, diethyl adipate, dimethyl azelate, dibutyl sebacate, dimethyl methadipate and dimethyl hexahydrophthalate. Dialkyl esters of saturated acyclic hydrocarbon dicarboxylic acids in which the alkyl groups each contain from 1 to 4 carbon atoms and the dicarboxylic acid contains from 5 to 10 carbon atoms are preferred since in general they yield solutions having the highest polymer content.

This invention is applicable to and is usually practiced with copolymers consisting essentially of the reaction product of 50 to 85% tetrafluoroethylene and 50 to 15% ethylene.

The polymer solution can be conveniently prepared by agitating the polymer with the solvent at temperatures ranging from approximately 200° up to the boiling point of the solvent. Solutions prepared in this manner will gel upon cooling to temperatures somewhat below that used in the preparation of the solution. The temperature of gelation is dependent somewhat upon the solvent, the concentration of the solution and the viscosity of the polymer. Thus, highly concentrated solutions, e. g. about 40% solids, usually gel at higher temperatures than do solutions containing lower concentration of polymer. Similarly solutions of polymer containing high viscosity polymer gel at higher temperatures than do solutions containing lower viscosity polymers. In general, the solubility of the polymer is decreased and the gel temperature of polymer solutions is raised as the percentage of tetrafluoroethylene in the polymer is increased.

By employing the neutral esters of dicarboxylic acids of the type hereinbefore described, solutions of tetrafluoroethylene/ethylene copolymers can be obtained in which the polymer concentration ranges from 1 up to approximately 40%. The present process is of particular value in that the solutions can be obtained with copolymers made from tetrafluoroethylene and ethylene alone, and without including in the polymer reaction mixture any modifying agent designed to improve solubility.

The new solutions of tetrafluoroethylene/ethylene copolymers disclosed herein are advantageously used in a number of applications, for example for the preparation of the polymer dispersions, for coating metal objects such as wire, for casting films and for impregnating glass fibers and porous objects such as fabrics, paper, regenerated cellulose and wood.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a solution in organic solvent of a copolymer of tetrafluoroethylene and ethylene containing from 50% to 85% tetrafluoroethylene, said solvent being a neutral ester of a saturated dicarboxylic acid containing at least 5 carbon atoms, said ester being free of multiple carbon to carbon linkages and containing from 7 to 18 carbon atoms.

2. A process for obtaining a solution in an organic solvent of a copolymer of tetrafluoroethylene and ethylene containing from 50% to 85% tetrafluoroethylene, said process comprising heating said polymer with a neutral ester at a temperature of from 200° C. to that of the boiling point of said ester, said ester being an ester of a saturated dicarboxylic acid containing at least 5 carbon atoms, said ester being free of multiple carbon to carbon linkages and containing from 7 to 18 carbon atoms.

KENNETH L. BERRY.